United States Patent Office 2,766,142
Patented Oct. 9, 1956

2,766,142

COATED GLASS STRANDS AND PROCESS OF PREPARING THE SAME

Walter M. Thomas, Springdale, Conn., assignor to American Cyanamid Company, New York, N. Y., a corporation of Maine No Drawing. Application May 3, 1952,
Serial No. 286,030

10 Claims. (Cl. 117—126)

This invention relates to a process for producing laminates comprising coated glass fibrous strands and to the product thus produced. More specifically, this invention relates to the process of coating glass fibrous strands with glycidyl acrylate or glycidyl methacrylate and a polymerizable unsaturated polyester resin and copolymerizing the copolymerizable coating on the strands to form a laminate. Still further, this invention relates to the concept of applying the coating to the strands either as a mixture or by applying the glycidyl acrylate or methacrylate and then coating with the unsaturated polyester resin, thereafter curing the resinous mixture in the form of a laminate by applying heat and pressure. Still further, this invention relates to the process outlined hereinabove, in which the polymerizable unsaturated polyester resin is further modified by admixture with a polymerizable compound free from epoxy groups but containing a $CH_2=C<$ group such as styrene, acrylonitrile and the like.

One of the objects of the present invention is to coat glass fibrous strands with either glycidyl acrylate or glycidyl methacrylate and a polymerizable unsaturated polyester resin and to copolymerize the coating on the strands to form a laminate. A further object of the present invention is to produce coated glass fibrous strands of the class described which will have particularly useful application in the field of glass filled laminates. These and other objects of the present invention will be discussed more fully hereinbelow.

In the practice of the process of the present invention, I have discovered that glycidyl acrylates and particularly the polyglycidyl acrylates display a very strong bond when they are applied to glass fibrous strands. It is believed that the epoxy group is the effective grouping in these monomeric and polymeric materials which causes this improved bonding to the glass fibrous strands. The unsaturated double bond in the acrylate or methacrylate grouping in these monomers or polymers makes way for the subsequent copolymerization with the polymerizable unsaturated polyester resin. It is immaterial whether the glycidyl acrylates are applied as a coating to the glass strands prior to or coincident with the application of the unsaturated polyester resin but it is preferred that the process be carried out, in this respect, in two successive steps. By applying one of the glycidyl acrylates as the first step, one is assured of a substantially complete coating of the glass strands by the particular glycidyl acrylate which coating will be bonded to the glass fibers much more readily and much more securely than would the unsaturated polyesters. When the mixture of the glycidyl acrylates and the unsaturated polyester resin is used, at least some of the glass strand is coated momentarily at least by the polyester resin and the bonding effect produced thereby is not quite as good as that effect produced when the entire strand is coated with the glycidyl acrylates.

The use of the expression "polymerizable unsaturated polyester resins" is intended to signify those products produced by the reaction of polyhydric alcohols with alpha, beta unsaturated polycarboxylic acids. Amongst these acids, which may be used are maleic, fumaric, aconitic and itaconic acids and the like. Other alpha, beta unsaturated polycarboxylic acids may be utilized which are well known in the art or their anhydrides whenever available. Quite obviously, one can make use of two or more of these alpha, beta unsaturated polycarboxylic acids to prepare the unsaturated polyester resins which are to be used in the process of the present invention. In certain instances, one could modify the polyester resins by using in addition to the alpha, beta unsaturated polycarboxylic acids such as malonic, succinic, glutaric, sebacic, and the like or polycarboxylic acids which are free from non-benzenoid unsaturation such as phthalic acid or its anhydrides. A sufficient amount of the alpha, beta unsaturated polycarboxylic acid should be used in the preparation of the polyester to insure copolymerization with the unsaturated double bond in (1) the acrylates or (2) the acrylates and polymerizable vinyl compound modifier such as styrene.

In preparing these unsaturated polyester resins, one may make use of such polyhydric alcohols as ethylene glycol, diethylene glycol, pentaerythritol, glycerol and the like. Quite obviously, these alcohols may be used singly or in combination with one another. It is believed that this technique of preparing these polyester resins needs no further discussion as it is well known and understood in the art.

Illustrative of the type of resin which may be classified as an unsaturated polyester resin modified with a compound containing the $CH_2=C<$ group are those set forth in the U. S. Patent Nos. 2,443,735–41, inclusive. More specifically, these compounds containing the $CH_2=C<$ group are allyl alcohol, methallyl alcohol, allyl acetate, allyl acrylate, diallyl malonate, diallyl oxalate, diallyl succinate, diallyl adipate, diallyl phthalate, diallyl maleate, triallyl tricarballylate, triallyl phosphate, amongst many others.

Other compounds which are conventionally used to modify the unsaturated polyester resins and which are copolymerizable therewith are styrene, alpha methyl styrene, ortho, meta, or para alkyl styrenes such as ortho methyl styrene, meta ethyl styrene, para butyl styrene or the halo substituted styrenes such as ortho chloro styrene, 2,4-dichlorostyrene, 2,5-dichlorostyrene, and the like or acrylonitrile, methacrylonitrile and the like.

If the coating of the glycidyl acrylate or glycidyl methacrylate is to be applied to the strands alone as a first step, it may be applied either in monomeric or polymeric form and may be applied directly as a pure material or it can be utilized by dispersing it in any of the conventional solvent mediums preferably reactive solvents such as the monomeric vinyl compounds.

Similarly, when the unsaturated polyester is subsequently applied to the coated glass fibers, it can be applied as a solution of the resin in any of the conventional reactive solvents such as those mentioned above. If it is decided to apply the two components simultaneously as a mixture, the glycidyl acrylates or their polymers may be dispersed in the unsaturated polyester resin solution.

The processes for the preparation of the glass filaments to be treated in accordance with the present invention are well known in the art as represented by U. S. Patents 2,133,236, 2,133,238 and 2,175,225, amongst others. The filaments generally are of extremely small diameter in the order of magnitude of 0.0002–0.0004 inch and are combined into a strand containing generally about 200–204 or more filaments. In the manufacture of these glass filaments, molten glass maintained at a temperature of about 2500° F. is allowed to pass through a great plurality of dies at the base of the furnace to form glass threads or filaments which are drawn downwardly at about 6,000–10,000 ft. per minutes. The glycidyl acrylates or mixtures of the same with the unsaturated polyester resins may be applied to these glass filaments immediately after these filaments have been drawn downwardly from the furnace while the filaments are still in a comparatively hot condition. The inherent heat of the glass will serve to drive off any solvent which may be used to convey the glycidyl acrylate or resin mixture to the strands.

In order that the present invention may be more completely understood, the following examples are set forth for the purpose of illustration only, and any specific enumeration of detail should not be interpreted as a limitation on the case except as indicated in the appended claims.

*Example 1*

Glass fibrous strands while being drawn down from a conventional strand-making furnace are sprayed with glycidyl acrylate so as to coat the strands. Thereafter, the thus coated strands are then coated with a mixture of styrene and an unsaturated polyester resin (prepared by reacting a stoichiometrical excess of diethylene glycol with a mixture of adipic acid and maleic anhydride) wherein the ratio of the polyester to the styrene is about 2:1, respectively. The thus coated strands are then subjected to heat and pressure to further the polymerization not only between the styrene and the unsaturated polyester but between the mixture of these components and the glycidyl acrylate until a laminate is formed.

*Example 2*

Example 1 is repeated except in the place of the glycidyl acrylate, there is used glycidyl methacrylate and instead of applying it as an independent preliminary coating, it is applied in admixture with a styrene modified polyester of substantially the same type used in Example 1. After the strands have been coated with the polymerizable mixture the strands are heat treated to further the polymerization of the polymerizable mixture on the strands to form a laminate.

*Example 3*

Example 1 is repeated except that a solution of polyglycidyl acrylate dispersed in a suitable solvent, namely acetone, in a 60% solids solution is first sprayed onto the fibers and the glass strands are given a further heat treatment to drive off the solvent, whereupon a styrene modified polyester polymerizable mixture is applied in a rather thick layer onto the coated strands followed by a second heat and pressure treatment step which serves the function of forming a laminate by polymerizing the polyglycidyl acrylate, the styrene and the unsaturated polyester in the form of a copolymer of the three copolymerizable materials.

Although it has been indicated hereinabove, that the strands may be coated by spraying the polymerizable materials thereon either with or without solvent, other modes of approach may readily be taken such as coating the strands by passing the same through a solution of the polymerizable materials either in admixture or separately or the glass strands may be passed through a feed roll which conveys the polymerizable materials from a storage container to the glass strands or the strands coated with the glycidyl acrylates may be smeared with the polyester composition by use of a knife applicator. These modes of application of the polymerizable materials to the strands are merely illustrative of a number of approaches which may be taken and it can be readily seen that other techniques for application may readily be adopted in keeping with the teachings of the concept of the present invention.

A still further approach which may be adopted, apart from the actual application technique, resides in coating the glass strands some considerable time after they have been drawn down from the furnace wherein the strands when coated are in a relatively cold condition. If this approach is taken, a heat treating step is generally desirable although even this can be avoided merely by exposing the strands to air but this latter technique would tend to be time consuming and heat treatment step is therefore preferable. When the polymerizable acrylates of the class described are applied to the glass strands immediately after the latter have been drawn down from the furnace, the inherent heat of the strands may well be sufficient to anchor these glycidyl acrylates to the glass, particularly if the acrylates are applied without benefit of a solvent. When a solvent is used, however, it is generally preferred to use a heat treating step in order to drive off the solvent.

To expedite the polymerization, one can make use of polymerization catalysts such as the organic super oxides, aldehydic and acidic peroxides. Amongst the preferred catalysts, there are the acidic peroxides, e. g., benzoyl peroxide, phthaloyl peroxide, succinoyl peroxide, benzoyl acetic peroxide; fatty oil acid peroxides, e. g., coconut oil peroxides, lauric peroxide, oleic peroxide; alcohol peroxides, e. g. tertiary butyl peroxide, ditertiary butyl peroxide, 2,2-bis(tertiary butyl peroxy)butane, terpene peroxides, e. g., ascaridole or ketone peroxides such as methyl ethyl ketone hydroperoxide. If one wishes to accomplish the polymerization without use of a heating step after the coatings have been applied, one can readily make use of room temperature catalysts, such as 1-hydroxy cyclopentyl peroxide, 1-hydroxy cyclohexyl hydroperoxide-1, 1-hydroxy cycloheptyl hydroperoxide-1, and the like. To increase the effectiveness of these room temperature catalysts, it is often desired to use as an accelerator to the polymerization, certain of the metallic salt driers such as cobalt naphthenate, lead naphthenate and the like. These catalysts and accelerators can be used in the amounts which are known to be conventional in the art.

In preparing the surface laminates in accordance with the concept of the present invention, one could make use of those temperatures and pressures which are conventionally considered to be those used in low pressure laminating such as temperatures between about 200 and 240° F. but preferably at about 220° F. and pressures between 0 and 500 p. s. i. but preferably at about 200 p. s. i. By zero pressure is meant contact pressure only made by the platen on the laminate to be cured.

If an inert solvent is to be used, one should select a suitable material which will be volatile at the laminating temperature. Conventionally used solvents in the category are acetone, methyl ethyl ketone, diethyl ketone, toluene and the like. It is preferred, however, to use as solvents particularly, for the unsaturated polyester resins, one of the reactive monomers of the class defined hereinabove, namely those containing a $CH_2=C<$ group or, more specifically, styrene, acrylonitrile and the like.

I claim:

1. A process comprising coating glass fibrous strands with (1) a member selected from the group consisting of a glycidyl acrylate and a glycidyl methacrylate and (2) a polymerizable unsaturated polyester resin prepared by reacting a saturated aliphatic polyhydric alcohol and an alpha, beta unsaturated polycarboxylic acid, thereafter copolymerizing the recited components of the coating on the strands.

2. A process comprising coating glass fibrous strands with a mixture of (1) a member selected from the group consisting of glycidyl acrylate and glycidyl methacrylate and (2) a polymerizable unsaturated polyester resin prepared by reacting a saturated aliphatic polyhydric alcohol and an alpha, beta unsaturated polycarboxylic acid, thereafter copolymerizing the recited components of the coating on the strands.

3. A process comprising coating glass fibrous strands with (1) a member selected from the group consisting of glycidyl acrylate and glycidyl methacrylate, coating the coated strands with a polymerizable unsaturated polyester resin prepared by reacting a saturated aliphatic polyhydric alcohol and an alpha, beta unsaturated polycarboxylic acid, thereafter copolymerizing the recited components of the coatings on the strands.

4. A process comprising coating glass fibrous strands with (1) a member selected from the group consisting of glycidyl acrylate and glycidyl methacrylate, coating the coated strands with a polymerizable mixture of a compound containing a $CH_2=C<$ group free from an epoxy grouping and a polymerizable unsaturated polyester resin prepared by reacting a saturated aliphatic polyhydric alcohol and an alpha, beta unsaturated polycarboxylic acid, thereafter copolymerizing the recited components of the coatings on the strands.

5. A process comprising coating glass fibrous strands with (1) a member selected from the group consisting of polyglycidyl acrylate and polyglycidyl methacrylate, coating the coated strands with (2) a polymerizable mixture of a compound containing a $CH_2=C<$ group free from an epoxy grouping and a polymerizable unsaturated polyester resin prepared by reacting a saturated aliphatic polyhydric alcohol and an alpha, beta unsaturated polycarboxylic acid, thereafter copolymerizing the recited components of the coatings on the strands.

6. A process comprising coating glass fibrous strands with (1) a member selected from the group consisting of polyglycidyl acrylate and polyglycidyl methacrylate, coating the coated strands with a polymerizable unsaturated polyester resin prepared by reacting a saturated aliphatic polyhydric alcohol and an alpha, beta unsaturated polycarboxylic acid, thereafter copolymerizing the recited components of the coating on the strands.

7. A process comprising coating glass fibrous strands with (1) a member selected from the group consisting of polyglycidyl acrylate and polyglycidyl methacrylate, coating the coated strands with (2) a polymerizable mixture of styrene and a polymerizable unsaturated polyester resin prepared by reacting a saturated aliphatic polyhydric alcohol and an alpha, beta unsaturated polycarboxylic acid, thereafter copolymerizing the recited components of the coatings on the strands.

8. Glass fibrous strands coated with a copolymer of (1) a member selected from the group consisting of glycidyl acrylate and glycidyl methacrylate and (2) a polymerizable unsaturated polyester resin prepared by reacting a saturated aliphatic polyhydric alcohol and an alpha, beta unsaturated polycarboxylic acid, said copolymer having been copolymerized on the glass strands.

9. Glass fibrous strands coated with a copolymer of (1) a member selected from the group consisting of glycidyl acrylate and glycidyl methacrylate and (2) a polymerizable mixture of a compound containing a $CH_2=C<$ group free from an epoxy group and a polymerizable unsaturated polyester resin prepared by reacting a saturated aliphatic polyhydric alcohol and an alpha, beta unsaturated polycarboxylic acid, said copolymer having been copolymerized on the glass strands.

10. Glass fibrous strands coated with a copolymer of (1) a member selected from the group consisting of glycidyl acrylate and glycidyl methacrylate and (2) a polymerizable mixture of styrene and a polymerizable unsaturated polyester resin prepared by reacting a saturated aliphatic polyhydric alcohol and an alpha, beta unsaturated polycarboxylic acid, said copolymer having been copolymerized on the glass strands.

References Cited in the file of this patent

UNITED STATES PATENTS

| | | |
|---|---|---|
| 2,123,152 | Rivat | July 5, 1938 |
| 2,278,207 | Mathes | Mar. 31, 1942 |
| 2,298,295 | Hyatt et al. | Oct. 13, 1942 |
| 2,403,872 | Miller | July 9, 1946 |
| 2,580,901 | Erickson | Jan. 1, 1952 |
| 2,606,175 | Price | Aug. 5, 1952 |
| 2,631,960 | Dafter | Mar. 17, 1953 |

OTHER REFERENCES

Modern Plastics, November 1950, Silver et al. (pages 113–122).